Oct. 17, 1967

S. R. KRAUSE 3,348,030

APPARATUS FOR PHOTO-ELECTRICALLY SCANNING
AND COUNTING PHYSICAL INVENTORY

Filed Dec. 22, 1964

INVENTOR
Steven R. Krause

BY Wilkinson, Mawhinney & Theibautt
ATTORNEYS

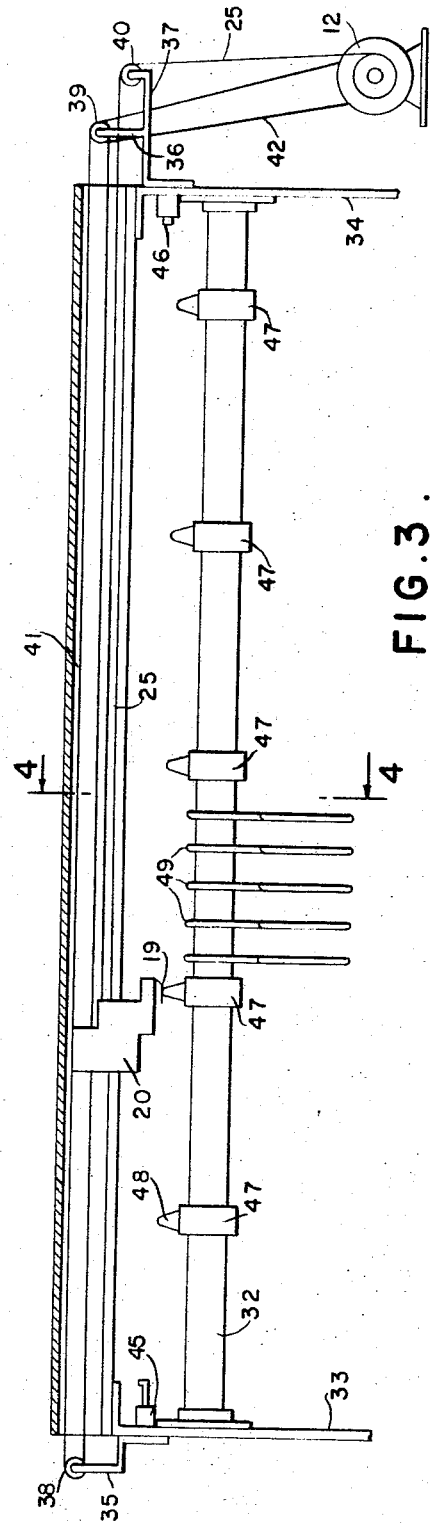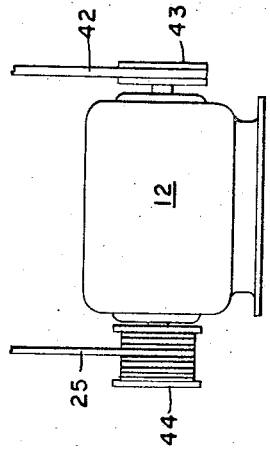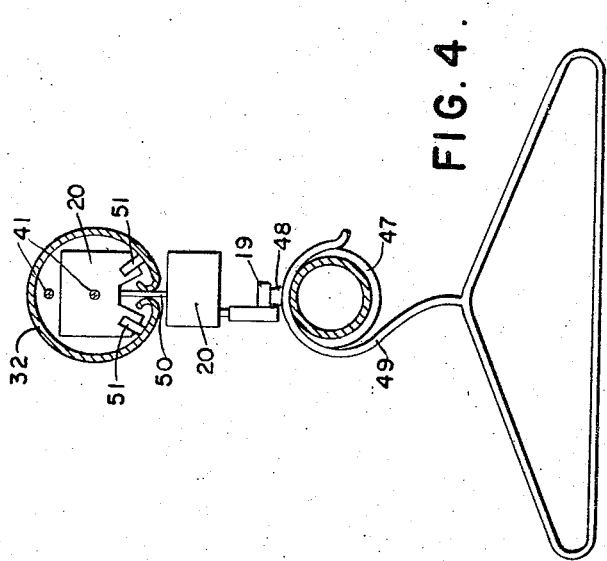

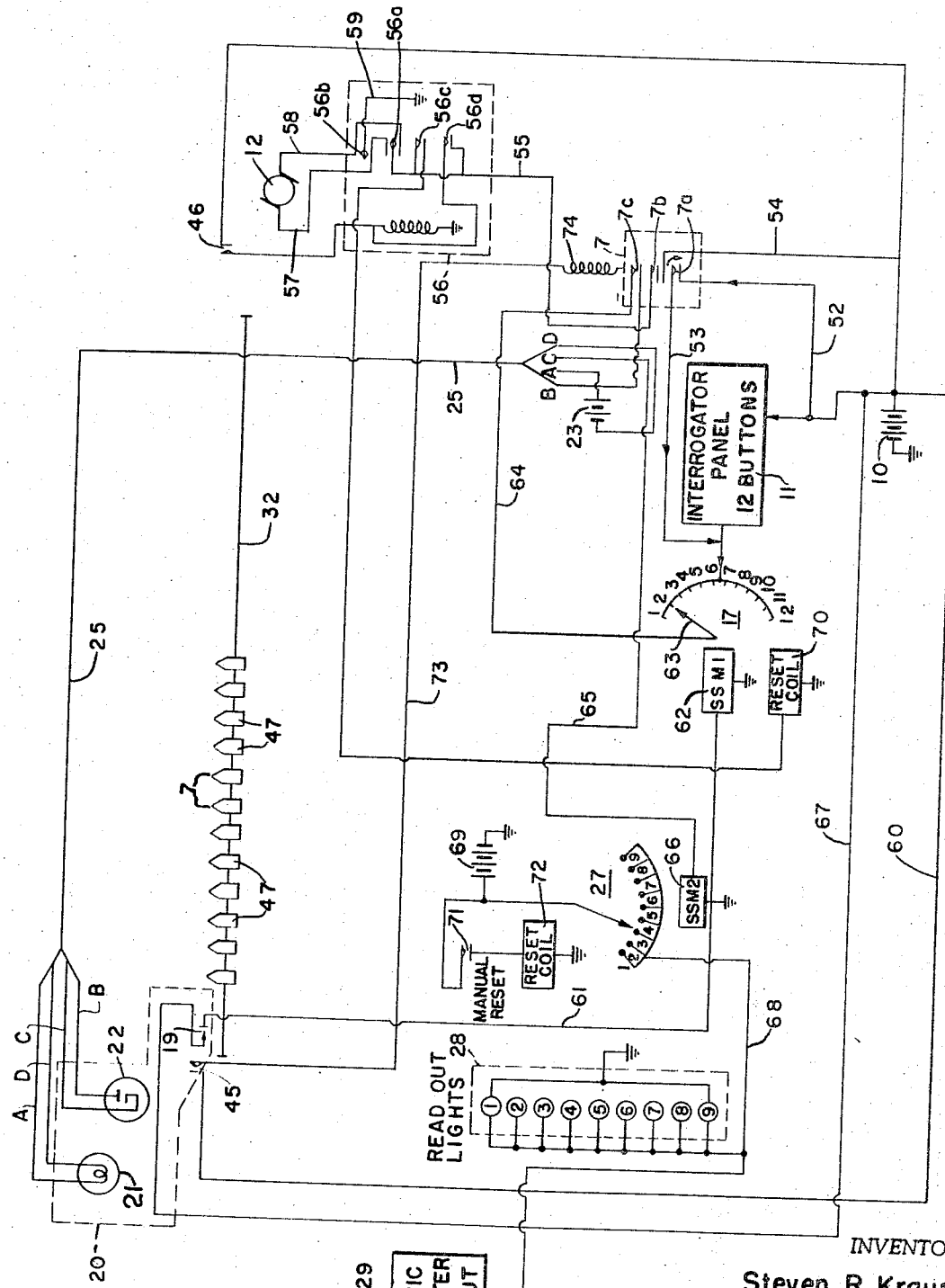

United States Patent Office 3,348,030
Patented Oct. 17, 1967

3,348,030
APPARATUS FOR PHOTO-ELECTRICALLY SCANNING AND COUNTING PHYSICAL INVENTORY
Stephen R. Krause, Baltimore, Md., assignor to K & M Electronics Company, Baltimore, Md., a corporation of Maryland
Filed Dec. 22, 1964, Ser. No. 420,283
11 Claims. (Cl. 235—92)

The present invention relates to an apparatus for photo-electrically scanning and counting physical inventory, and has for an object to provide a system for counting and determining size, number, manufacturer and color of hanging goods for either male or female wearing apparel or the like.

Another object of the present invention is the provision of an apparatus for taking a physical inventory of articles then actually physically present at the time of taking the inventory as distinguished from punch card systems, punch tapes, etc., where some form of card, disc or other object bearing indicia is representative of a piece of inventory, which piece may not actually be physically present due to theft or removal from the premises without up-dating of the cards whereby billing done from such cards or discs would be inaccurate and subject to challenge at the delivery end upon checking and unpacking of the goods shipped against the shipping invoice.

A further object of the present invention is the provision of a photo-electric scanning inventory apparatus which will take an inventory automatically and print out the then physically present inventory at a given time on an electric typewriter so that a buyer will know how to order in advance without having to wait for comparison and analysis of ticket stubs and other conventional presently employed methods of taking inventory.

A still further object of the present invention is to provide a basic unit system which may be expanded onto multiples, the present basic disclosure being by a module from which a large number may be employed for scanning a huge warehouse or multiple warehouses in other areas through use of data-phone or other terminal equipment.

Another object of the present invention is the provision of an apparatus in which the photo-scanning unit moves over the inventory rather than having the inventory move past a photo-scanner which enables one to keep the inventory in a static immobile condition, not requiring conveyor belts, chains or other forms of traveling mechanism for the inventory.

The present invention provides a visual read-out for immediate reading by the interrogator and through the electric typewriter provides a stockbook record.

With the foregoing and other objects in view, the invention will be more fully described hereinafter, and will be more particularly pointed out in the claims appended hereto.

In the drawings, wherein like symbols refer to like or corresponding parts throughout the several views:

FIGURE 3 is a section through a basic module unit showing the inventory hanging rack with the photo-scanning and traversing mechanism.

FIGURE 4 is a vertical section taken through the module of FIGURE 3 on the lines 4—4.

FIGURE 5 is a side elevational view of the photo-scanning traversing motor and associated winches.

FIGURE 6 is a detailed electrical schematic of the block diagram of FIGURE 1.

Figure 1:
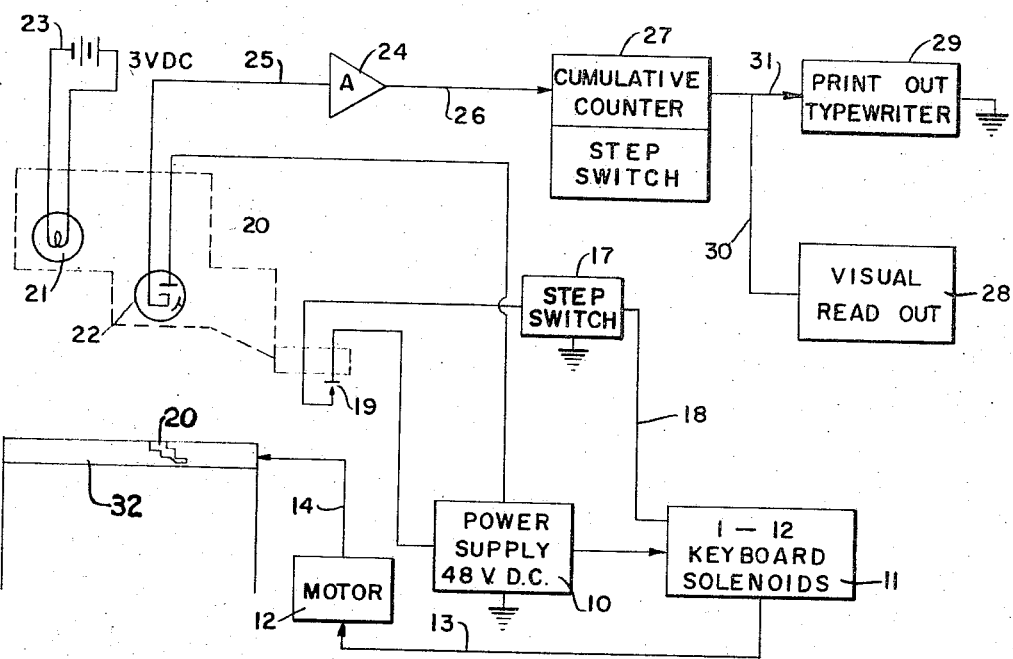
FIGURE 1 is an electrical schematic of a basic module unit constructed in accordance with the present invention, showing the scanning and read-out associated equipment.

Referring more particularly to the drawings, and for the moment to a general description of FIGURE 1, 10 designates a power supply preferably of forty-eight volts D.C. supplying a 1–12 keyboard solenoid interrogating panel 11. The keyboard panel 11 provides the electric power necessary to drive the scanning traverse motor 12 through line 13 while line 14 contains therein suitable reversing switches for causing back and forth traverse of a photo-electric scanning unit 15 carried in a modular rack 16 containing units of inventory thereon.

Also energized from the keyboard 11 is a counter step switch 17 through line 18 and this counter step switch 17 is pulsed by a mechanically closable switch 19 actuated by stops carried on the inventory support bar. This switch 19 is carried on a photo-electric scanning unit 20 which contains a lamp 21 and a photo-electric cell 22. Power is supplied to the lamp 21 through a 3-volt D.C. battery source 23 and the signal from the photo-electric cell is directed to an amplifier 24 through line 25, and from the amplifier through line 26 to a cumulative counter step switch 27.

Coming off the step switch 27 is provided a visual read-out presentation 28 and an electric typewriter print-out unit 29. These come off the cumulative counter step switch 27 through lines 30 and 31 respectively.

Referring now to FIGURE 3, the basic modular unit for supporting hanging inventory will be described. A hanging or support bar for inventory is shown at 32, this bar being mounted on vertical supports 33, 34 and is rigid with respect thereto. The support members 33, 34 carry fixed supports 35, 36 and 37 for pulleys 38, 39 and 40, respectively. The pulleys 38, 39 have roved thereabout a cable 41 to which the photo-electric scanning unit 20 is secured to one run thereof. The photo-electric scanning unit is secured to the lower or bottom run of the cable 41, as best seen in FIGURE 4. Pulley 39 is a double pulley, one of which has cable 41 roved about it while the other has a cable 42 roved thereabout which is connected about a winch or drum 43 secured for rotation with the armature of motor 12.

Passing over pulley 40 is the photo-electric control cable 25 which connects at one end to the photo-electric scanning unit 20 and which is connected at the other end to a winch 44 through well-known slip ring assembly connections for rotary drums for electrically connecting the cable in circuit while permitting it to be wound upon and paid out from a winch.

The end to end traverse of the photo-electric scanning unit 20 is controlled by limit switches 45 and 46 carried by the standards 33, 34 which support the inventory hanging bar 32. Carried over the inventory support bar and spaced axially along its length at predetermined intervals are switch actuating collars 47 which have upwardly projecting switch actuating projections 48.

As shown in FIGURE 3, between a pair of spaced collars 47 on bar 32 is a section showing five hangers 49 for containing units of inventory thereon.

As best seen in FIGURE 4, the inventory hanger support rod 32 has a slit 50 along its side to permit the photo-electric scanning unit 20 to ride upon rollers 51 inside the tube for supporting the actual photo scanning head externally thereof.

Figure 2:
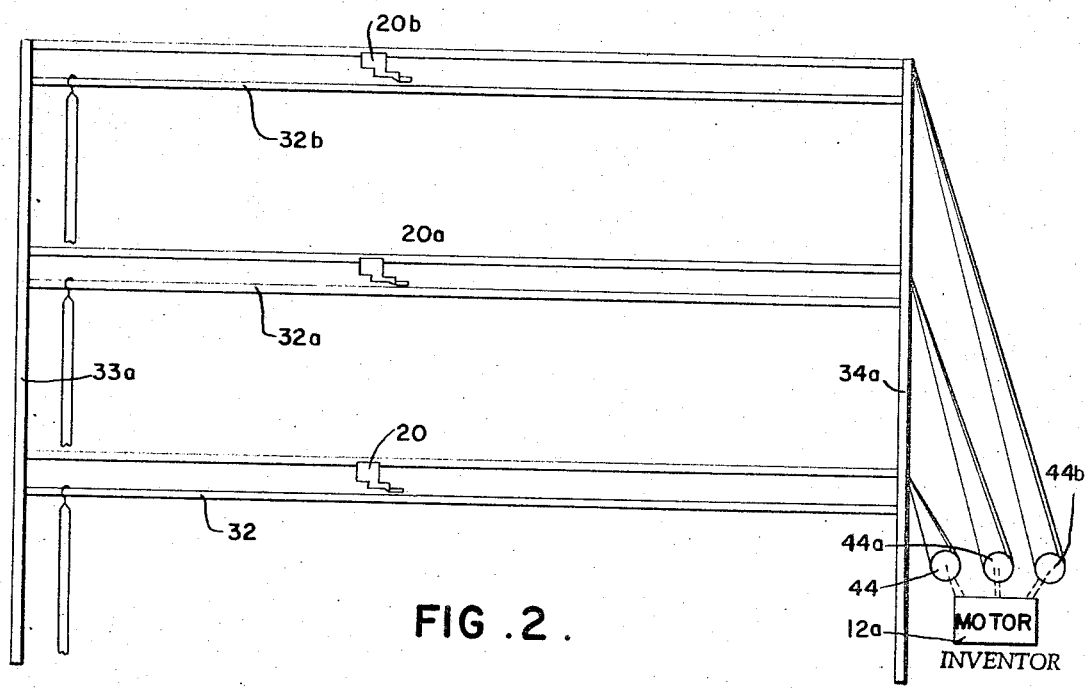
FIGURE 2 is a mechanical schematic of a basic three-tier unit employing the basic module of FIGURE 1 in a stacked section.

Referring now to FIGURE 2, it will be seen that the modular basic unit of FIGURE 3 has been arranged in a stacked section of three inventory supporting units. The support members 33a and 34a support the inventory supporting bars 32, 32a and 32b over which is passed photo-electric scanners 20, 20a and 20b. The photo-electric scanning units are controlled by winches 44, 44a and 44b in a manner described with respect to the motor and winch control in FIGURE 3 with the exception that in FIGURE 2, although three sets of winches for the traversing and photo-electric scanning take up cables the winches are controlled by a single large electric motor 12a.

A detailed explanation of the operation will now be given with respect to FIGURE 6. When it is desired to ascertain how many units of inventory are then physically present in section 7, the operator will press button number 7 on panel 11, it being understood that each button has a switch mechanism similar to that shown within the bracketed area 7. When this button 7 is pressed, contacts 7a are closed placing the battery 10 in contact through line 52, contact 7a, line 53 to step switch 17 putting a positive potential upon terminal 7 of step switch 17.

Contact 7b is likewise closed, placing positive potential from the battery 10 through line 54, contact 7b up through line 55, in through relay 56, in through contact 56a of relay 56; thence to motor 12 through line 57, the negative side going through line 58, contact 56b to ground through line 59. This energizes motor 12 causing the motor 12 and its associated winches 43, 44 to move photo-electric scanner unit 20 along its support bar 32 causing switch 19 to engage each of the switch engaging projections 48 on the collar members 47 carried on the inventory support bar 32.

Each time the switch 19 closes positive potential flows from battery 10 through the contacts of switch 19 by line 67 through line 61 and pulsing a coil 62 of step switch 17 causing the step switch wiper arm 63 to advance across the contacts of the step switch toward contact 7. When contact 7 is reached by the wiper arm 63, positive potential flows from battery 10 through line 52, switch contact 7a, line 53, through contact 7 of step switch 17 through the wiper arm 63; thence through line 64 and through contact 7c and into wire b of cable 25 to photo cell 22, it being understood that control cable 25 is subject to amplification as shown in FIGURE 1 for amplifying the signal.

The circuit is then completed through wire c from the photo-electric cell 22 back down the control cable 25, thence through line 65 to the coil 66 of step switch 27. Such action occurs each time light is reflected from light 21 through hangers 49 and up through photo cell 22.

This commences the counting of units between two spaced-apart collar members on the inventory support bar 32 which have been designated as area 7. When contact 19 is engaged by the next switch engaging projection 48, a pulse is pulsed by a signal from battery 10, up through wire 67 and into step switch motor 62 which advances step switch 17 to the next contact, thereby interrupting power from line 53 through contact 7 of step switch 17 and thereby turning off photo cell 22.

The total count of items 49 in section 7 will be accumulated by pulses in stepping switch 27, read-out of which can be made through contacts 1 through 9 of stepping switch 27 through cable 68 and into read-out lights 28 for electric typewriter print-out 29 by means of power from battery 69.

As scanner 20 advances to the end of inventory support bar 32, terminal limit switch 46 is engaged by the photo scanning head thereby bringing power from battery 10 through the contacts of limit switch 46 and energizing relay 56. When relay 56 energizes contact 56a and 56b reverse position, thereby reversing the direction of power on motor 12 which sends the scanner back to the point of origin. In addition contacts 56c and 56d are made.

Contact 56d, when made, causes power to flow from battery 10 through contact 7b and into operating coil of relay 56, causing relay 56 to stay energized after limit switch 46 is released by photo head 20. Contact 56c then receives positive potential from battery 10 through contact 7b, and into contacts 56c and into reset coil 70 of step switch 17, causing step switch 17 to reset to its home position.

Step switch 27 is reset manually by closing a button actuating contacts 71 which activate reset coil 72 causing step switch 27 to restore itself to the home position.

As scanner 20 traverses support bar 32 and reaches home position, limit switch 45 is engaged by the photo head 20, closing contacts 45, power then flowing from battery 10 through line 60, through contacts 45, line 73, into solenoid relays 74 thereby opening contacts 7a, 7b and 7c, thereby de-energizing motor 12 and bringing the system into static position, reset and ready to be reinterrogated.

While the basic modular unit as shown in FIGURE 3 has been described in detail, it will be appreciated that a large number of these modular units can be combined in stacked sections. FIGURE 2 shows a basic stacked section of three scanning units for three inventory support rods, each rod being divided into multiple sub-sections.

Figure 7:
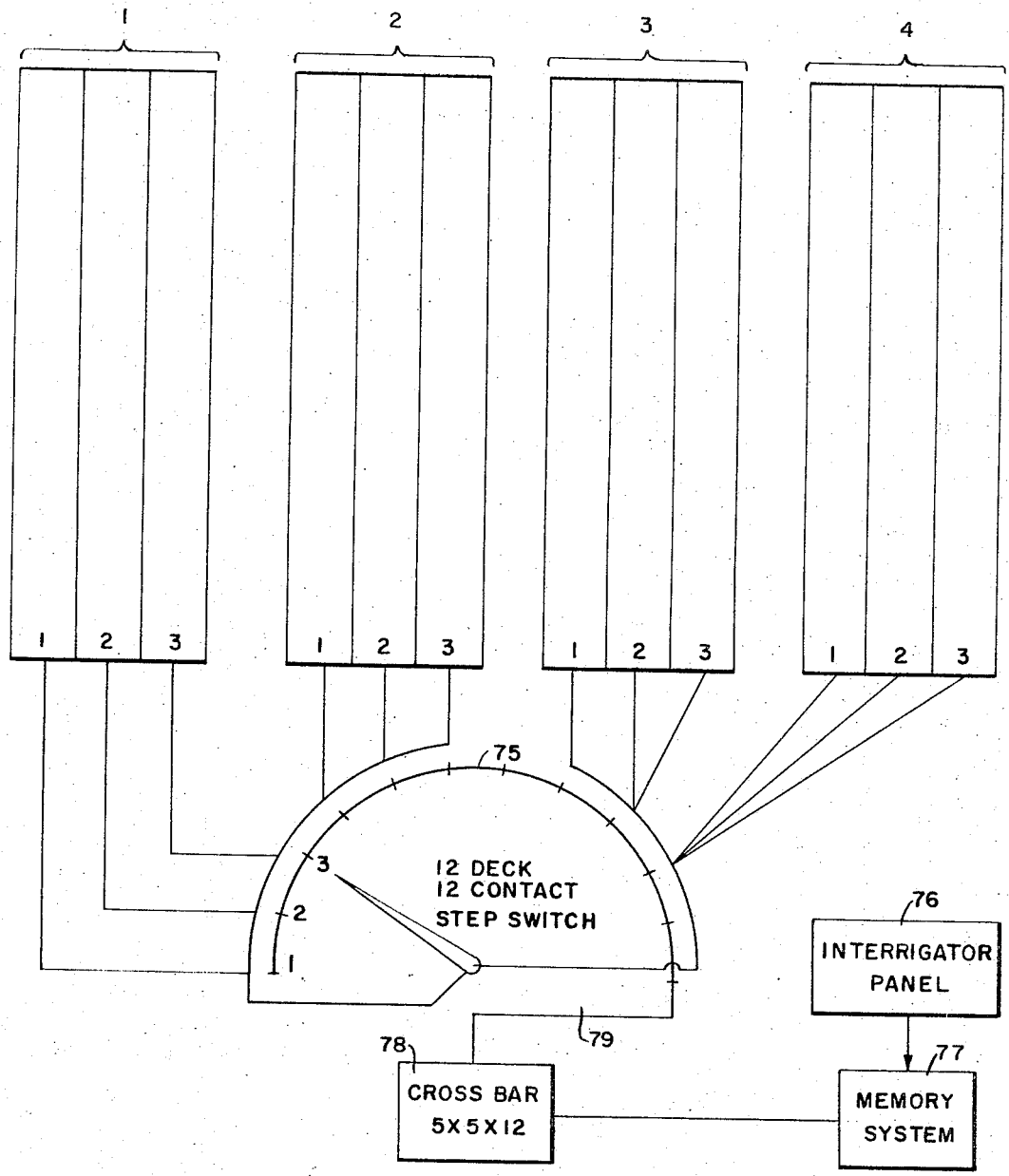
FIGURE 7 is a block diagram and schematic of a plurality of modular stacked sections showing how a plurality of the modular stacked sections could be integrated into a large inventory control system embodying the present invention.

Now FIGURE 7 shows four groups of stacked sections, there being three tiers in each section totaling twelve sections to be interrogated and as explained before each section is broken down into twelve units or sub-sections.

Each of the twelve inventory rods shown as 32 are connected into one, twelve-deck stepping switch 75, one deck being allotted for each inventory support bar. In addition each inventory support bar is further sub-divided into twelve sub-sections similar to that shown as section 7 in FIGURE 6.

Sub-section dividers 47 carried on each inventory support rod 32 define a specific area as to sub-section within a section. The mode of operation is the same as outlined on FIGURE 6. An interrogator panel 76 similar in operation to interrogator panel 11 is connected through a memory system 77 and thence to a cross bar mechanism 78, which cross bar is connected to step switch 75 through line 79. With this enlarged system of FIGURE 7 a code may then be assigned for each sub-section and area to be scanned.

By way of example, if we have a lot No. 1234, Size 32 Blk. in section 7, we may enter that designation into interrogator panel 76 which in turn introduces said designation into memory system 77, memory system 77 then comparing to see which area this particular designation is being stored in, then sending those signals to the proper cross bar for switching into the proper stepping switch deck which in turn selects the proper stacked section and the specific inventory support bar within the stacked section, and more specifically the exact sub-section on the specific inventory support bar as hereinbefore described.

Although I have disclosed herein the best form of the invention known to me at this time, I reserve the right to all such modifications and changes as may come within the scope of the following claims.

What is claimed is:
1. An apparatus for photo-electrically scanning and counting inventory to determine predetermined characteristics and number of units stored comprising
  (a) inventory storage means divided into sub-sections for storing inventory of differing characteristics in each sub-section;
  (b) photo-electric scanning means positioned above said inventory storage means for traversing the inventory storage area;
  (c) control means for preselecting a specific sub-section area for scanning and counting units of inventory stored within the sub-section;
  (d) and visual read-out means in circuitry with said control means and photo-electric scanning means to give a visual read-out of the number of inventory units stored within the interrogated sub-section.

2. An apparatus for photo-electrically scanning and counting inventory as claimed in claim 1, wherein
  (e) said inventory storage means is a rack for supporting articles on hangers in which said rack is subdivided into sub-sections.

3. An apparatus for photo-electrically scanning and counting inventory as claimed in claim 1, wherein
  (f) said photo-electric scanning means comprising a photo-electric eye secured to a traversing endless cable mechanism for being moved back and forth over the inventory storage area.

4. An apparatus for photo-electrically scanning and counting inventory as claimed in claim 1 wherein said control means for preselecting a specific sub-section area for scanning and counting of inventory comprises an interrogating panel in circuit with step switch means which step switch means is pulsed by the closing of electrical contacts carried by the photo-electric scanning means mechanically engaging sub-section limit stops carried by the inventory storage means for energizing the photo-electric scanner for counting units of inventory stored only within the preselected sub-section.

5. An apparatus for photo-electrically scanning and counting inventory as claimed in claim 1 wherein said visual read-out means is a digital read-out device is visually displaying the number of inventory units stored within the interrogating sub-section.

6. An apparatus for photo-electrically scanning and counting inventory as claimed in claim 1 wherein said visual read-out means comprises a page-printer and electric typewriter for presenting a printed record of the inventory in the sub-section interrogated.

7. An apparatus for photo-electrically scanning and counting inventory to determine predetermined characteristics and number of units stored comprising
  (a) a plurality of inventory storage means comprising a main section divided into sub-sections and tiered into staked sections for storing inventory of differing characteristics in each sub-section of a main section within a staked section,
  (b) photo-electric scanning means positioned above each inventory storage means main section for each tier of a staked section for traversing the inventory storage area,
  (c) control means for preselecting a specific sub-section of a selected main section of a tier of each staked section for scanning and counting units of inventory stored within each sub-section within a staked section,
  (d) and visual read-out means in circuitry with said control means and the photo-electric scanning means for each tier of a staked section to give a visual read-out of the numbers of units stored within the interrogated sub-section of the tiers within a staked section.

8. An apparatus for photo-electrically scanning and counting inventory as claimed in claim 7 wherein said inventory storage main sections are racks for supporting articles on hangers in which the sub-section is formed on a rack by sub-dividing the rack into individual identifiable sub-sections.

9. An apparatus for photo-electrically scanning and counting inventory as claimed in claim 7 wherein said photo-electric scanning means comprises a photo-cell traversable above each main section of a tier of staked sections for electrically counting the number of inventory units stored within the interrogated sub-section.

10. An apparatus for photo-electrically scanning and counting inventory as claimed in claim 7 wherein said visual read-out means comprises a page-printer and electric typewriter for showing a printed record for the inventory then physically present in the sub-section interrogated.

11. An apparatus for photo-electrically scanning and counting inventory as claimed in claim 7 wherein said visual read-out means comprises a numerical digital read-out mechanism for visually presenting the number of units then physically present in the sub-section interrogated.

References Cited
UNITED STATES PATENTS

| | | | |
|---|---|---|---|
| 1,872,258 | 8/1932 | Elferty | 250—223 X |
| 2,320,961 | 6/1943 | Whitcomb | 250—223 X |
| 2,816,479 | 12/1957 | Sloan | 250—222 |

MAYNARD R. WILBUR, *Primary Examiner.*

G. J. MAIER, *Assistant Examiner.*